(12) United States Patent
Poll

(10) Patent No.: US 7,464,969 B2
(45) Date of Patent: Dec. 16, 2008

(54) COMPRESSION CAP ASSEMBLY

(75) Inventor: Steven Allen Poll, Zeeland, MI (US)

(73) Assignee: Trans-Matic Mfg. Co., Incorporated, Holland, MI (US)

(*) Notice: Subject to any disclaimer, the term of this patent is extended or adjusted under 35 U.S.C. 154(b) by 0 days.

(21) Appl. No.: 11/353,769

(22) Filed: Feb. 14, 2006

(65) Prior Publication Data

US 2007/0200340 A1 Aug. 30, 2007

(51) Int. Cl.
*F16L 13/14* (2006.01)
*F16L 33/00* (2006.01)

(52) U.S. Cl. ............ 285/242; 285/382; 285/361; 285/396; 285/402

(58) Field of Classification Search ............ 285/55, 285/242, 382, 222.1–222.5, 361, 396, 402
See application file for complete search history.

(56) References Cited

U.S. PATENT DOCUMENTS

| | | | | |
|---|---|---|---|---|
| 793,869 A * | 7/1905 | Anderson | ............ | 285/330 |
| 1,679,709 A * | 8/1928 | Cooper | ............ | 285/81 |
| 1,916,449 A * | 7/1933 | Tompkins | ............ | 285/331 |
| 2,907,591 A * | 10/1959 | Gulick | ............ | 285/148.14 |
| 2,913,260 A * | 11/1959 | Givens | ............ | 285/151.1 |
| 3,649,052 A * | 3/1972 | Snyder, Jr. | ............ | 285/38 |
| 4,408,786 A * | 10/1983 | Stuemky | ............ | 285/256 |
| 4,909,545 A * | 3/1990 | Hohol | ............ | 285/39 |
| 5,667,251 A * | 9/1997 | Prest | ............ | 285/12 |
| 5,904,183 A * | 5/1999 | Leech | ............ | 138/110 |
| 6,439,617 B1 * | 8/2002 | Boer et al. | ............ | 285/256 |
| 6,786,131 B2 * | 9/2004 | Tsai | ............ | 91/432 |
| 7,134,696 B2 * | 11/2006 | Poll | ............ | 285/256 |
| 2004/0222631 A1 * | 11/2004 | Baxi et al. | ............ | 285/252 |
| 2005/0161939 A1 * | 7/2005 | Poll | ............ | 285/93 |
| 2005/0161941 A1 * | 7/2005 | Poll et al. | ............ | 285/93 |

* cited by examiner

*Primary Examiner*—Robert J Sandy
*Assistant Examiner*—Jay R Ripley
(74) *Attorney, Agent, or Firm*—Shook, Hardy & Bacon

(57) ABSTRACT

A compression cap is provided with a first connector and a fitting is provided with a second connector. The first connector locks onto the second connector to hold the cap to the fitting before the clamp is crimped. The first connector is a hook that extends outwardly from a first end of the compression cap, and the second connector is a protrusion on the fitting. The first and second connectors can be secured with a bayonet connection before the cap is compressed. The cap may also include at least one inward deformation that engages the outer surface of the pipe as the cap is slid onto the pipe, creating friction between the pipe and the cap and thereby preventing the cap from falling off the pipe prematurely.

11 Claims, 8 Drawing Sheets

COMPRESSION CAP ASSEMBLY

BACKGROUND OF THE INVENTION

The present invention is related to compression caps, and more particularly to a compression cap assembly used in pipe connections.

Compression caps are well known for connecting a section of pipe or tubing to a fitting. The current method is a metal band that is positioned and crimped onto the end of a pipe or tube to secure the tube to a fitting. The pipe may be plastic, such as polyethelyne cross linked (PEX), or another suitable material. The cap is crimped using a specially designed tool. These caps may be used in a wide variety of applications including recreational vehicles, manufactured homes, marine crafts, stick built homes, and beverage dispensing machines.

A number of difficulties arise in the installation of conventional compression connectors. After a connector is placed on the end of the pipe, the fitting must be inserted into the end of the pipe and all three of the pipe, fitting and clamp must be physically held in place until the connector is compressed. The task of holding everything together requires two hands, and if it is not done, the fitting may pull out of the pipe or the connector may fall off the pipe or become incorrectly oriented on the pipe. These problems are exacerbated when the installation of a connector is attempted in a tight space, because the user may only be able to reach the pipe, clamp and fitting with one hand, leaving one or no hands to make the connection with an install tool.

SUMMARY OF THE INVENTION

The aforementioned installation problems are overcome by the present invention, wherein a compression cap is provided with a first connector, and a fitting is provided with a second connector. The first connector snap-fits to the second connector to hold the clamp to the fitting before the clamp is crimped.

In one embodiment, the first connector includes a hook that extends outwardly from a first end of the compression cap, and the second connector includes at least one protrusion on the fitting. The protrusion on the fitting may also function as a tube stop. In this embodiment, the hook mounts to the tube stop with a bayonet connection to prevent the fitting from falling off the cap before the cap is compressed.

In another embodiment, the cap also includes at least one inward deformation that engages the outer surface of the pipe as the clamp is slid onto the pipe, creating friction between the pipe and the clamp and thereby preventing the clamp from falling off the pipe prematurely.

The present invention provides a number of advantages over conventional compression connectors. First, users of the present invention are no longer required to hold the fitting in position on the pipe, or to hold the pipe in an upright position to keep the fitting from falling off of the pipe before the clamp is crimped. Second, the inward deformation aids in preventing the cap from slipping, moving, or being pushed out of position on the pipe before the crimp is performed. Third, the installation of caps and fittings is much faster and easier with the present invention, because the pipe can be inserted over the fitting and into cap at the same time. Fourth, the first and second connectors ensure a secure connection between the cap and the fitting, because the fitting is properly positioned on the cap before the cap is crimped.

These and other objects, advantages, and features of the invention will be readily understood and appreciated by reference to the detailed description of the current embodiments and the drawings.

DETAILED DESCRIPTION OF THE CURRENT EMBODIMENTS

Figure 1:
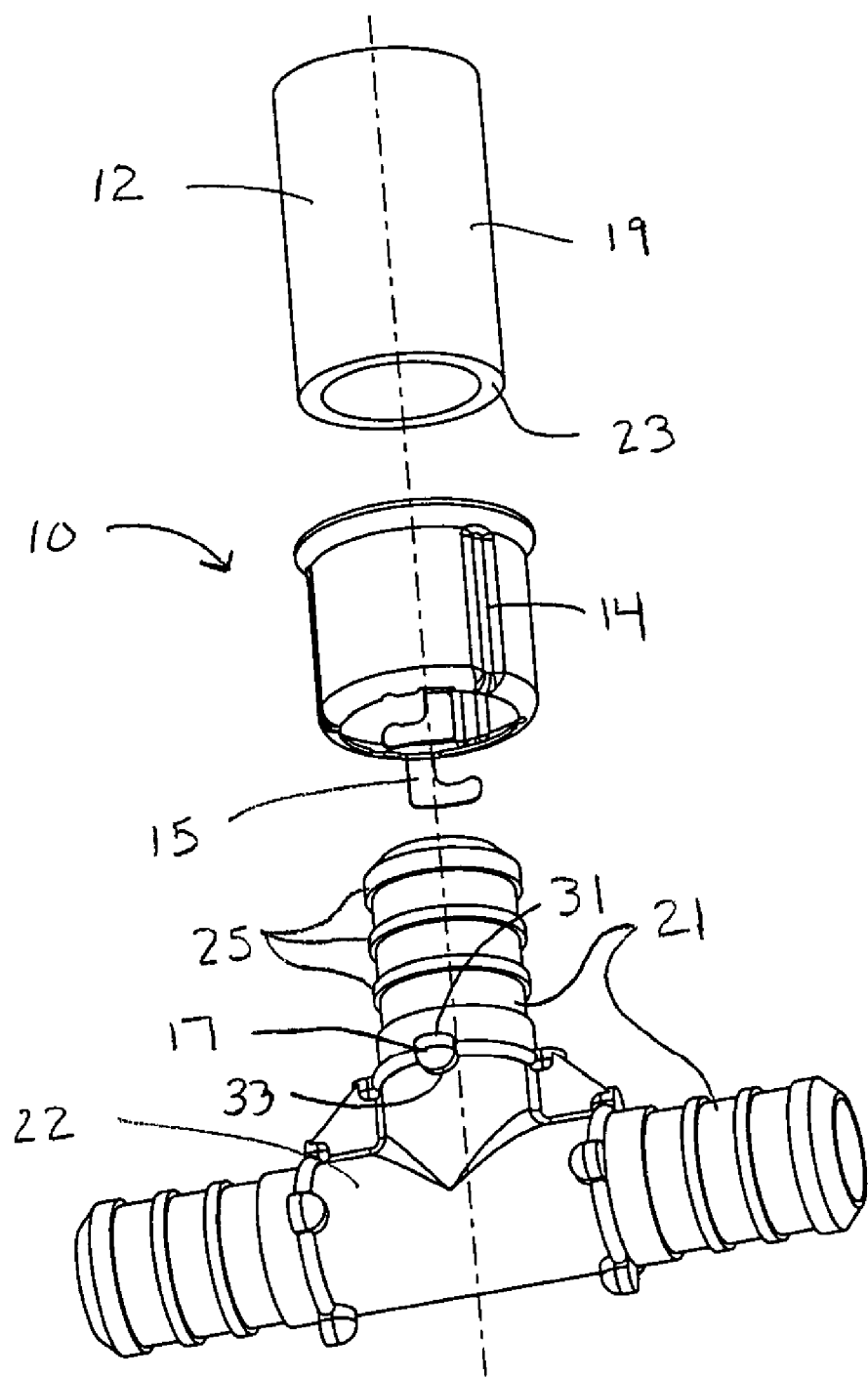
FIG. 1 is an exploded perspective view of compression cap, a pipe and a fitting according to one embodiment of the present invention.

A compression cap in accordance with one embodiment of the present invention is shown in FIG. 1 and generally designated 10. The cap 10 is preferably a metal band that is capable of slidably fitting over a pipe or tube 12. The cap 10 generally includes a connector 15 for snap-fitting the cap 10 to a fitting 22. In the operation of one embodiment, the cap 10 is placed over the end of the pipe 12, and the fitting 22 is inserted into the cap 10 at the same end of the pipe 12. The connector 15 is then snap-fitted to a portion 17 of the fitting 22. The cap 10 is then crimped with a crimping tool (not shown) to compress the cap 10 about the pipe 12 and the fitting 22, securing the fitting 22 inside the pipe 12.

I. Structure

Figure 2:
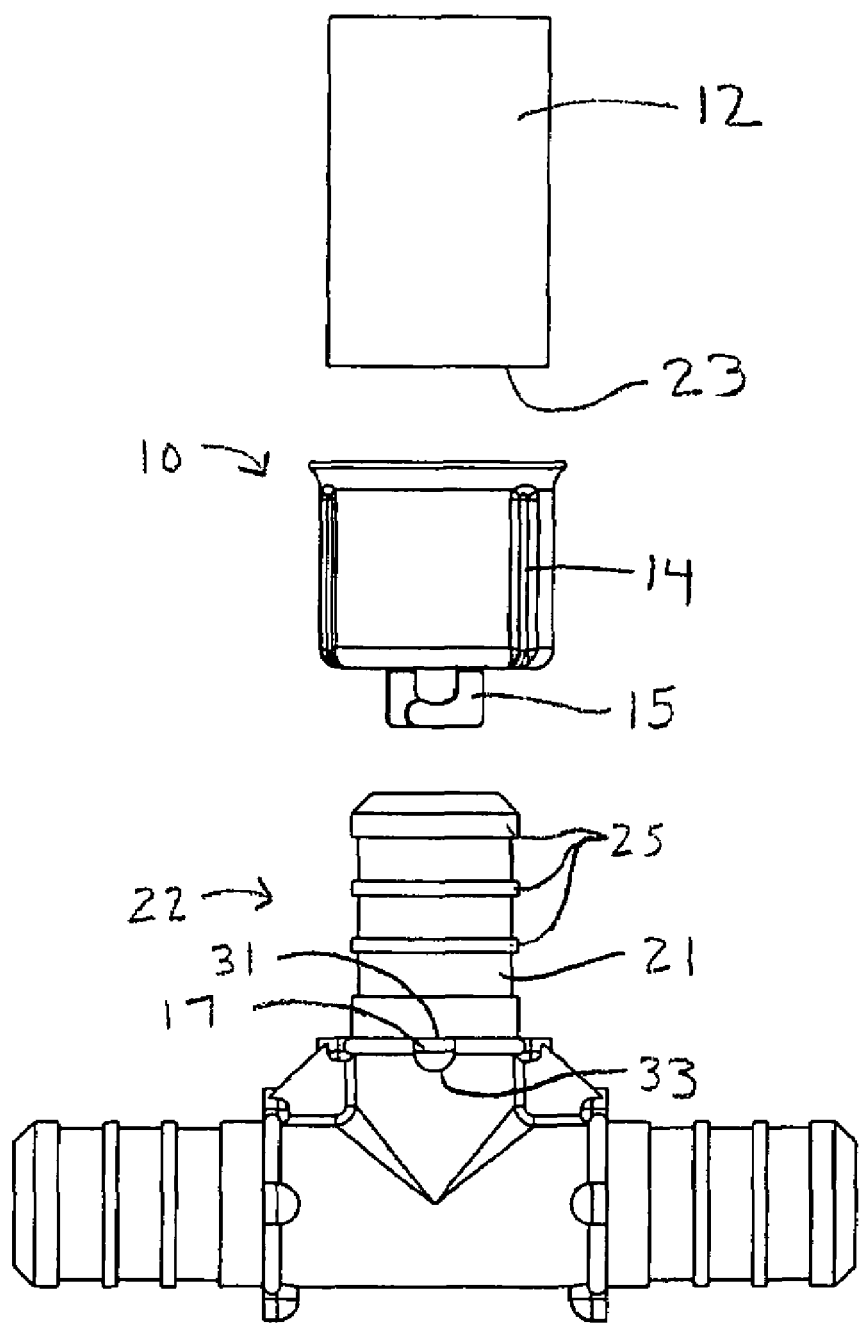
FIG. 2 is an exploded front view of the compression cap, a pipe and a fitting thereof.
Figure 3:
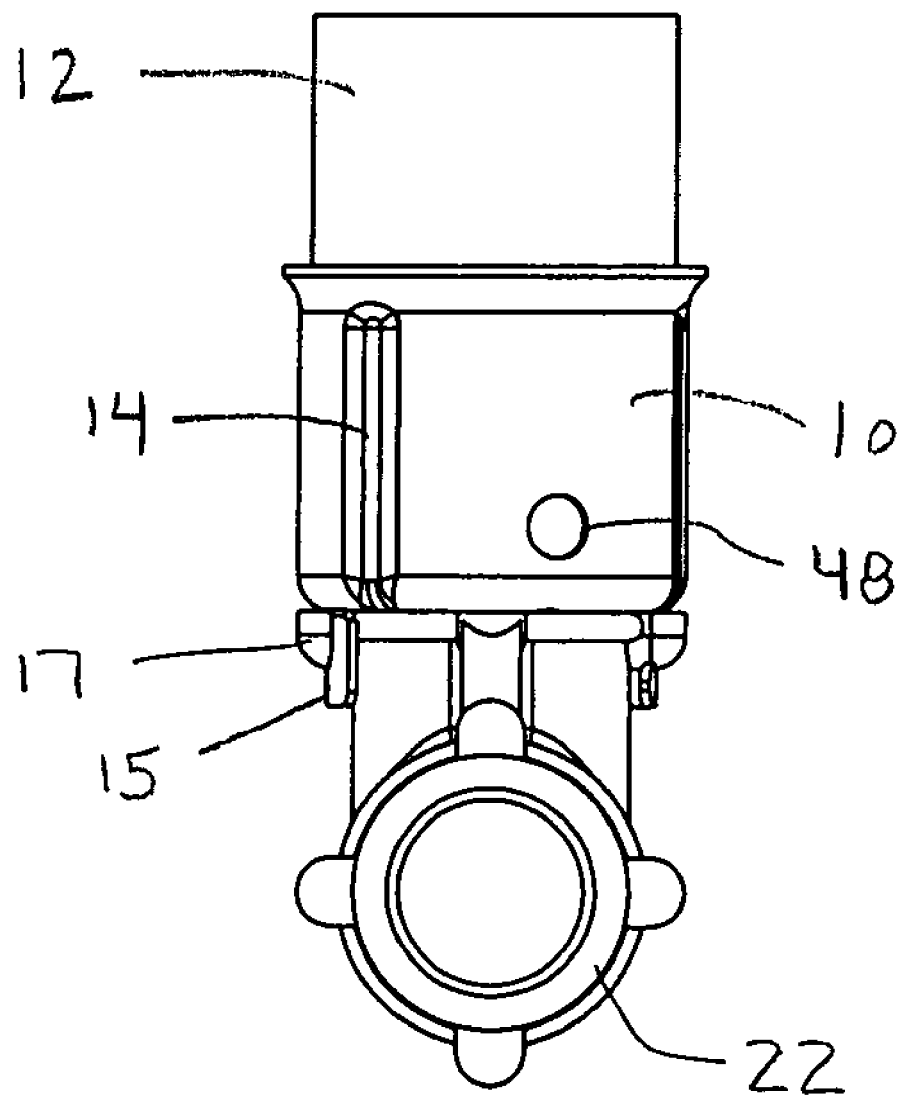
FIG. 3 is a side view of the cap, pipe and fitting, with the pipe inserted into the cap and the fitting inserted onto the pipe and snap-fitted to the cap.
Figure 4:
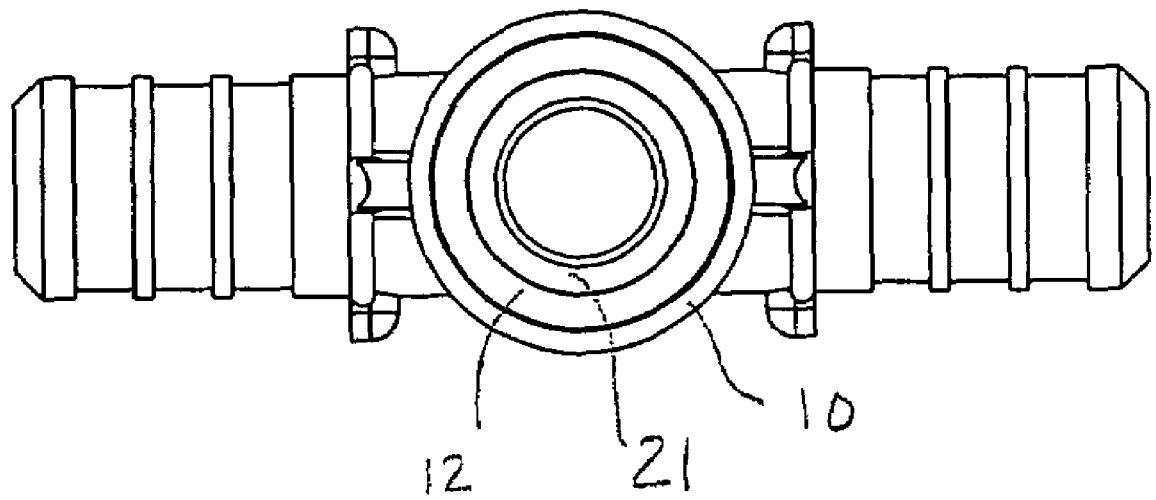
FIG. 4 is a top view thereof.
Figure 5:
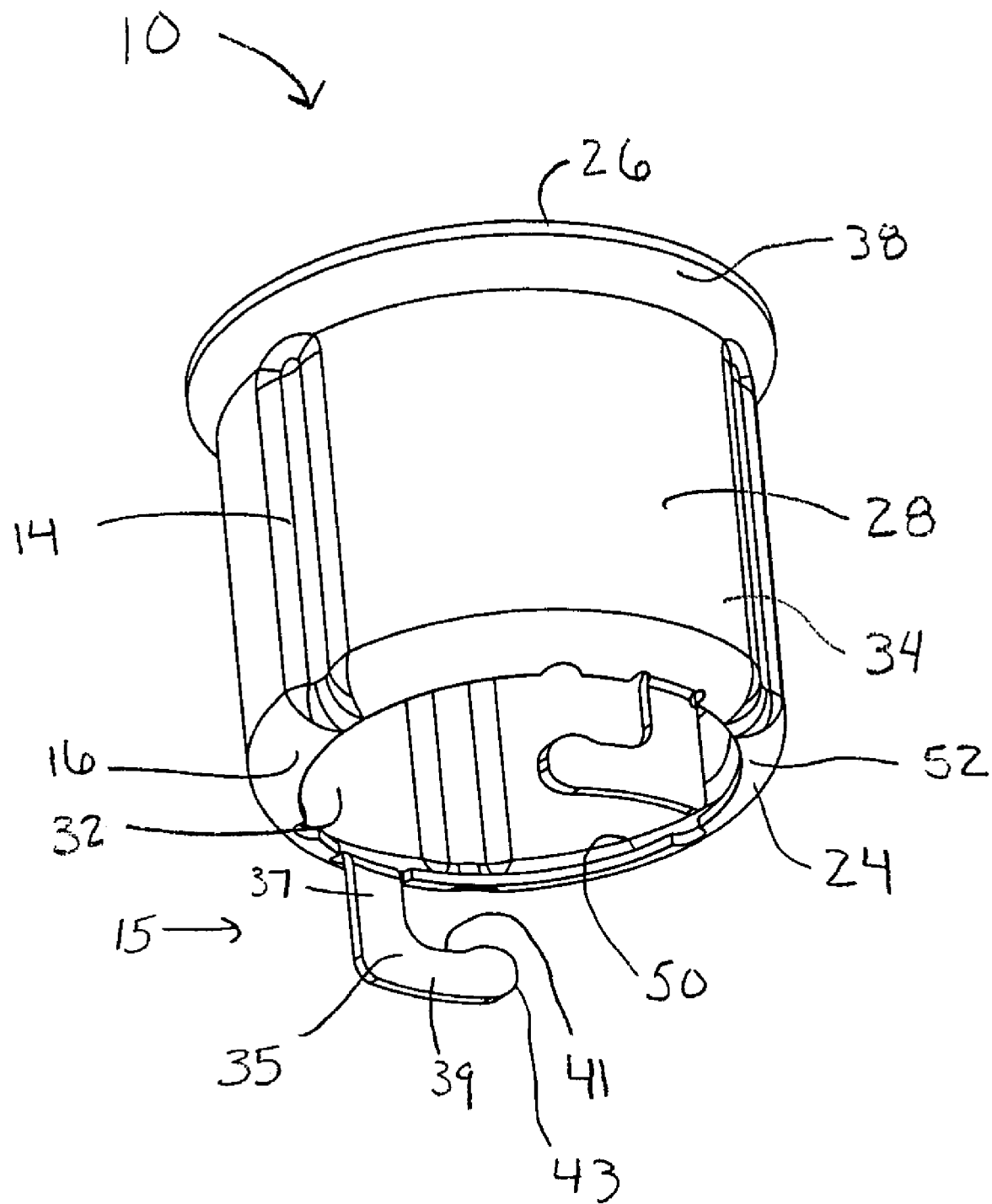
FIG. 5 is a perspective view of the compression cap according to an embodiment of the present invention.
Figure 6:
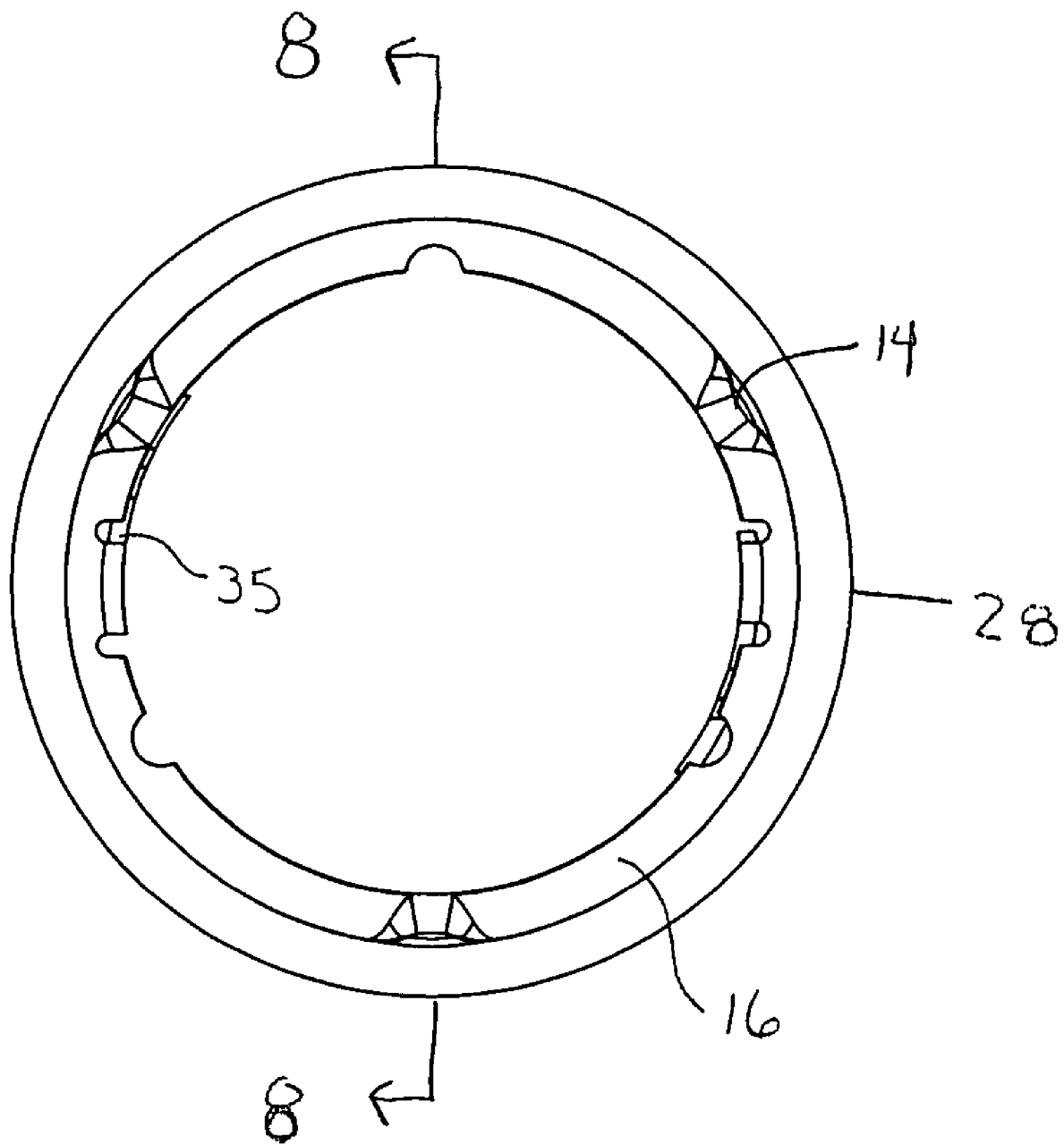
FIG. 6 is a top view of the compression cap thereof.
Figure 7:
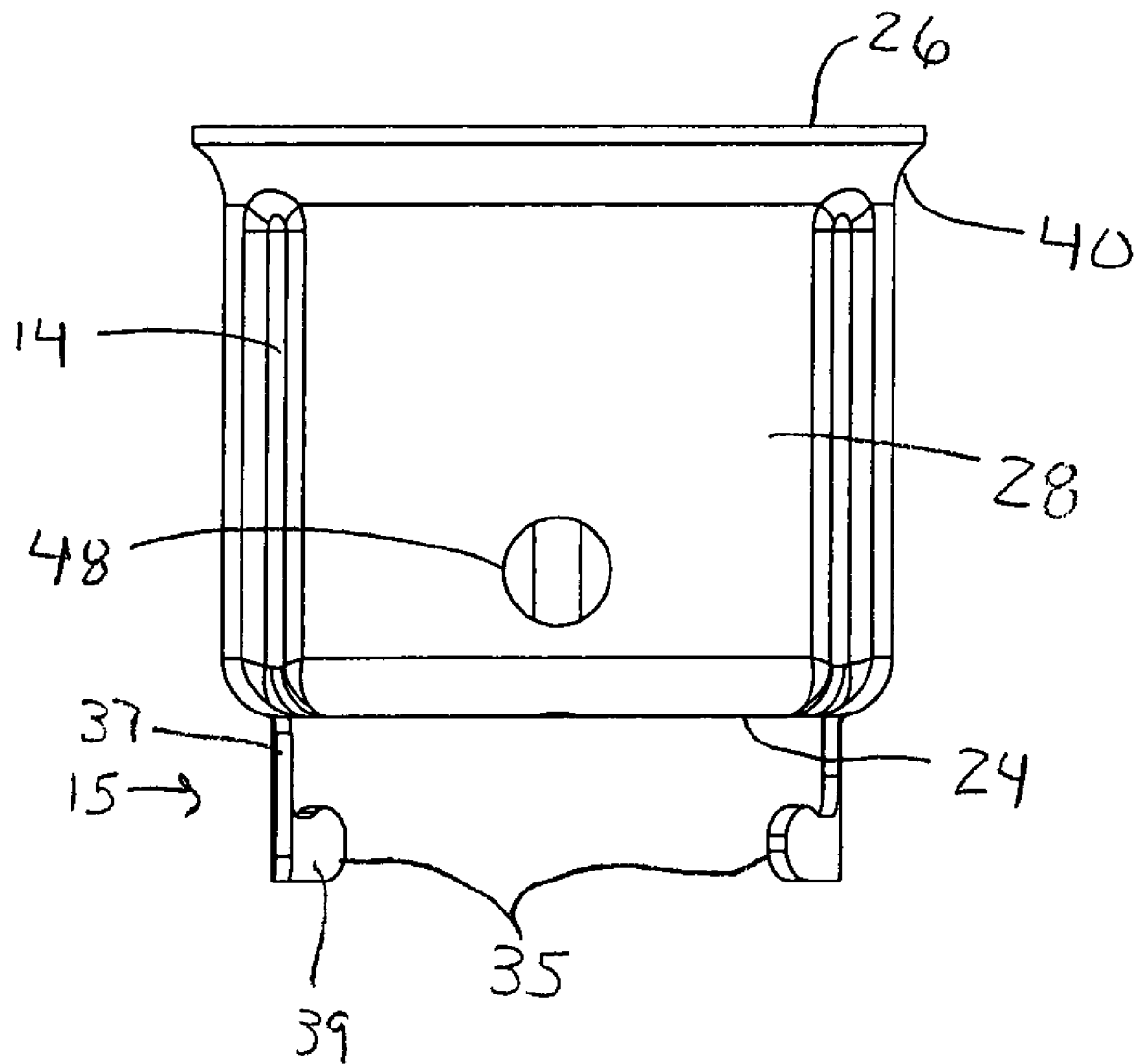
FIG. 7 is a side view of the compression cap thereof.

Shown in FIGS. 1, 2 and 3, the pipe 12 is well known and generally comprised of, but not limited to, plastic, such as PVC or PEX (cross linked polyethylene). The pipe includes an outer surface 19, and an end 23 that will receive the cap 10. Depending on the desired application, the pipe may be a rigid or flexible, and may have a variety of standard sizes.

The fitting 22 is generally comprised of a metal, such as brass, or plastic, and includes at least one insert portion 21 having a diameter slightly smaller than the inner diameter of the pipe 12 such that it can be inserted into the end 23 of the pipe 12. As shown, the fitting 22 is a T-shaped fitting 22 that includes three insert portions. The T-shaped fitting 22 illustrated is intended to be exemplary of just one type of such pipe fittings. Each insert portion may include a plurality of spaced barbs 25 that enable the pipe 12 to grip the fitting 22 and seal about the fitting 22 when the cap 10 is compressed on the pipe 12. As shown in FIGS. 1-3, the fitting 22 additionally includes a portion 17 that snap-fits to the cap 10. In the illustrated embodiment, the portion 17 includes a plurality of protrusions 17 that are spaced apart about the circumference of the insert portion 21. In this embodiment, the protrusions 17 include a generally flat upper surface 31 and a generally curved lower surface 33. The protrusions 17 are positioned at the base of the insert portion 21, so that the upper surface 31 forms a tube stop to prevent the pipe 12 and cap 10 from sliding over the fitting 22 past the protrusions 17. Although the portion 17 that snap-fits to the cap 10 is illustrated as a plurality of protrusions 17, the portion 17 could alternatively be one or more protrusions of a variety of shapes, or one or more indentations in the fitting 22 for receiving a connector on the cap 10.

As shown in FIGS. 5-8, the cap 10 is generally a metal band having a circumference of any desired size so that it fits over a desired pipe or tube. The cap 10 includes a first end 24, a second end 26, and a side wall 28 extending between the first end 24 and second end 26. The width of the side wall between the first and second ends 24 and 26 may vary with the desired application. The side wall 28 also includes an inner surface 32, an outer surface 34. In one embodiment, a lip 38 extends radially outward from the second end 26. The lip 38 includes a radius 40 that forms a smooth transition with the side wall 28. In an alternative embodiment (not shown), the cap 10 may include a means for aiding in crimping the cap, such as a crimping ear that extends outwardly from the sidewall 28, that allows the use of a single sized tool to crimp various sized clamps.

In one embodiment, a positive stop flange 16 extends radially inward from the first end 24 of the cap 10. The flange 16 may extend around the entire circumference of the cap 10, having an inner surface 50, and an outer surface 52. The depth of the flange 16 is approximately the same, but not greater than, the thickness of the pipe 12, so that the fitting 22 may still be inserted through the cap 10 and into the end of the pipe 12. In another embodiment, the side wall 28 includes a hole 48, or witness window. The hole 48 is proximate to the first end 24 of the cap 10, allowing a user to view the pipe 12 through the window 48 when the cap 10 is placed on the pipe 12.

The cap 10 also includes a connector 15 that snap-fits to the portion 17 on the fitting 22. In the illustrated embodiment, the connector 15 includes a pair of hooks 35 that extend axially outwardly from the first end 24 of the sidewall 28. As shown, the hooks 35 may extend from the outer surface 52 of the stop flange 16. The hooks 35 are generally L-shaped, including a first member 37 extending from the stop flange 16, and a second member 39 extending at approximately a right angle from the first member 37. The second member 39 includes an inner surface 41 that may be curved, for example, with an area of increased thickness near the tip 43 of the second member 39. The curve of the inner surface 41 of the second member 39 may be shaped to correspond to the shape of the curve on the lower surface 33 of the tube stop protrusion 17 on the fitting 22, to enable to hooks 35 to snap-fit over the protrusions 17. Although the connector 15 is illustrated as a pair of hooks 35, the connector may alternatively have a variety of shapes that connect the cap 10 to the fitting 22 before the cap 10 is compressed. For instance, the connector 15 may be an radially inwardly extending protrusion that fits into an indentation in the fitting to hold the cap 10 on the fitting before the cap 10 is compressed.

Figure 8:
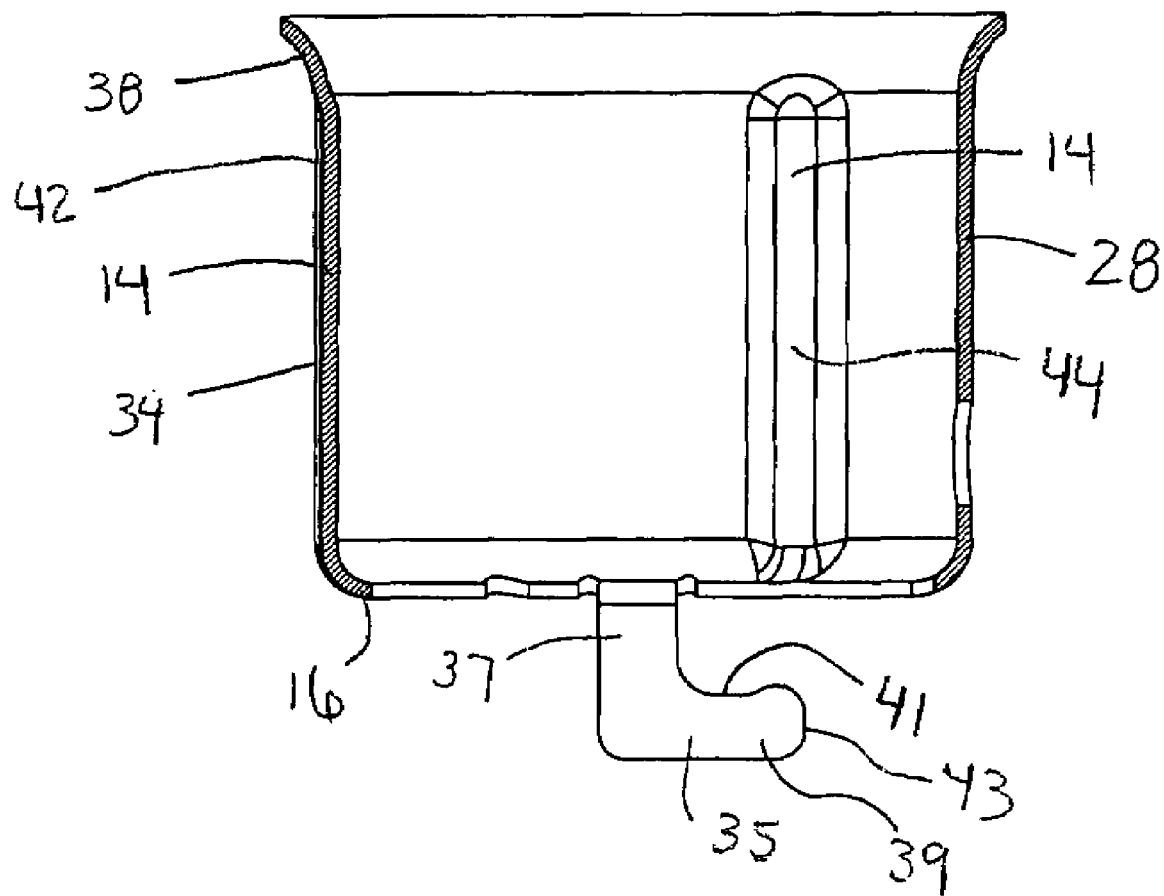
FIG. 8 is a front cross sectional view of the compression cap thereof, taken through line 8-8 in FIG. 6.

The side wall 28 may also include a plurality of inward deformations. As shown in FIG. 8, in one embodiment, the inward deformations are a plurality of ribs 14. The ribs 14 may extend across the substantial width of the side wall 28, forming an indentation 42 in the outer surface 34 and a corresponding protrusion 44 on the inner surface 32. The depth of the protrusion 44 may vary depending on the desired interference between the ribs 14 and the pipe 12. In another embodiment, three ribs 14 are spaced evenly about the sidewall 28. However, any number of ribs 14 may be used, and the ribs 14 may have a different orientation, such as running circumferentially about the cap 10. Alternatively, the inward deformations may be a number of dimples, or a differently shaped inward deformation that creates a friction fit between the cap 10 and the pipe 12.

II. Operation

In operation, the second end 26 of the cap 10 is positioned proximate to the end 23 of the pipe 12. A user will then slide the cap 10 onto the end 23 of the pipe 12. As the cap 10 slides onto the pipe 12, the lip 38 on the second end 26 of the cap 10 serves to guide the pipe 12 into the cap 10, and then the ribs 14 engage the outer surface 19 of the pipe 12, creating a friction fit between the ribs 14 and the pipe 12 for crimping. The pipe 12 is slid onto the cap 10 until the end 23 of the pipe 12 contacts the inner surface 50 of the positive stop flange 16, and the pipe 12 is visible through the window 48. The flange 16 prevents the cap 10 from sliding farther onto the pipe 12, and the friction fit created by the ribs 14 prevents the clamp from sliding off the pipe 12 without a force being applied by the user. Once the cap 10 is in place, the insert portion 21 of the fitting 22 is inserted into the end 23 of the pipe 12, simultaneously passing through the cap 10. As the insert portion 21 is inserted into the pipe 12, the insert 21 and cap 10 are aligned such that the hooks 35 pass between adjacent tube stop protrusions 17. The fitting 22 is inserted into the pipe 12 until the outer surface 52 of the positive stop flange 16 engages the tube stop protrusions 17 at the base of the insert 21. The cap 10 (or both the cap 10 and pipe 12) is rotated in a clockwise direction such that the second members 39 of the hooks 35 fit behind the curved lower surface 33 of the protrusions 17. The corresponding curved surface 41 of the hooks 35 snap-fits over the curved lower surface 33 to hold the clamp snugly together with the fitting 22. In an alternative embodiment, the insert portion 21 of the fitting 22 can be inserted into the first end 24 of the cap 10 and rotated to snap-fit to the cap 10 before the pipe 12 is inserted into the cap 10. In this embodiment, the pipe 12 is inserted into the second end 26 of the cap 10 between the cap 10 and the fitting 22. Once the pipe 12, cap 10 and fitting 22 are fitted together and the cap 10 is snap-fitted to the fitting 22, the cap 10 is crimped with a crimping tool to compress the cap 10 onto the pipe 12, and compress the pipe 12 onto the fitting 22.

The above description is that of the current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A pipe connection comprising:
   a pipe having an end;
   a compression clamp receiving the end of the pipe, said compression clamp having a long axis, the clamp having a generally cylindrical wall, said generally cylindrical wall having opposite longitudinal ends, one of said ends being a pipe receiving end and the other of said ends being a connecting end, said connecting end including a radially inwardly extending shoulder which defines a positive stop flange, said connecting end further including a plurality of distinct and separate hooks extending from a radially inner portion of said radially inwardly extending shoulder along said long axis; and
   a fitting inserted into the end of the pipe, the fitting including a plurality of protrusions, said plurality of distinct and separate hooks snap-fitting with said plurality of protrusions to hold said clamp on said fitting.

2. The pipe connection of claim 1 wherein each of said plurality of protrusions includes a curved surface, each of said hooks including an inner surface engaging one of said protrusions, said inner surface being curved to correspond to the curve of said curved surface of said protrusion.

3. The pipe connection of claim 1 wherein said clamp includes at least one inward deformation in said cylindrical wall, said at least one inward deformation providing a friction fit between said clamp and said pipe as said clamp is slid onto said pipe.

4. A compression clamp for securing the end of a pipe to a fitting, wherein an end of the pipe can be inserted into the clamp and a portion of the fitting can be inserted into the end of the pipe, such that the clamp can be compressed to secure the pipe onto the fitting, the compression clamp comprising:
   a generally cylindrical sidewall having a long axis adapted to receive the end of the pipe, the sidewall having a first end and a second end opposite the first end, said first end including a radially inwardly extending shoulder which defines a positive stop flange; and
   a plurality of L-shaped connectors extending from said first end along said long axis, each of said plurality of L-shaped connectors having a first member extending from a radially inner portion of said radially inwardly extending shoulder and a second member extending at approximately a right angle from said first member, said plurality of L-shaped connectors being, capable of snap-fitting over a portion of the fitting to hold the clamp and the fitting together before the clamp is compressed.

5. The compression clamp of claim 4 wherein said sidewall includes at least one inward deformation, said at least one inward deformation projecting radially inwardly from said sidewall, whereby a friction fit with the pipe is created as the pipe is inserted into the clamp.

6. The compression clamp of claim 5 wherein said clamp includes a plurality of said inward deformations spaced about the circumference of said clamp.

7. The compression clamp of claim 6 wherein said at least one of said inward deformations is a longitudinal rib.

8. A compression clamp for securing the end of a pipe to a fitting, wherein an end of the pipe can be inserted into the clamp and a portion of the fitting can be inserted into the end of the pipe, such that the clamp can be compressed to secure the pipe onto the fitting, the compression clamp comprising:
   a generally cylindrical sidewall having a long axis to receive the end of the pipe, the sidewall having a radially inwardly extending end wall which defines a positive stop flange; and
   a plurality of distinct and separate L-shaped connectors, each of said plurality of L-shaped connectors having a first member extending from a radially inner portion of said radially inwardly extending end wall and a second member extending at approximately a right angle from said first member, said plurality of L-shaped connectors being capable of snap-fitting over a portion of the fitting to hold the clamp and the fitting together before the clamp is compressed,
   whereby, upon insertion of the pipe into said compression clamp, the pipe substantially abuts said positive stop flange defined by said radially inwardly extending end wall.

9. The compression clamp of claim 8 wherein said sidewall includes at least one inward deformation, said at least one inward deformation projecting radially inwardly from said sidewall, whereby a friction fit with the pipe is created as the pipe is inserted into the clamp.

10. The compression clamp of claim 9 wherein said at least one inward deformation is longitudinal rib.

11. The compression clamp of claim 8 wherein said clamp includes a plurality of said at least one inward deformations spaced about the circumference of said clamp.

* * * * *